(12) United States Patent
Liu et al.

(10) Patent No.: US 12,625,352 B2
(45) Date of Patent: May 12, 2026

(54) NEAR-EYE DISPLAY DEVICE AND NEAR-EYE DISPLAY OPTICAL ASSEMBLY

(71) Applicant: SeeYA Optronics Co., Ltd., Shanghai (CN)

(72) Inventors: Bo Liu, Shanghai (CN); Lei Nui, Shanghai (CN)

(73) Assignee: SeeYA Optronics Co., Ltd., Shanghai (CN)

( * ) Notice: Subject to any disclaimer, the term of this patent is extended or adjusted under 35 U.S.C. 154(b) by 297 days.

(21) Appl. No.: 18/292,295

(22) PCT Filed: Apr. 26, 2023

(86) PCT No.: PCT/CN2023/090808
§ 371 (c)(1),
(2) Date: Jan. 25, 2024

(87) PCT Pub. No.: WO2024/138975
PCT Pub. Date: Jul. 4, 2024

(65) Prior Publication Data
US 2025/0004260 A1 Jan. 2, 2025

(30) Foreign Application Priority Data
Dec. 29, 2022 (CN) .......................... 202211715544.7

(51) Int. Cl.
*G02B 13/18* (2006.01)
*G02B 17/08* (2006.01)
*G06F 1/16* (2006.01)

(52) U.S. Cl.
CPC ............. *G02B 13/18* (2013.01); *G02B 17/08* (2013.01); *G06F 1/163* (2013.01)

(58) Field of Classification Search
CPC .... G02B 13/18; G02B 17/08; G02B 27/0172; G06F 1/163
See application file for complete search history.

(56) References Cited

U.S. PATENT DOCUMENTS 10,353,203 B2 * 7/2019 Cai ..................... G02B 27/0172
2014/0146394 A1 * 5/2014 Tout ........................ G02B 26/10
359/630
(Continued)

FOREIGN PATENT DOCUMENTS

CN 104932105 A 9/2015
CN 105137590 A 12/2015
(Continued)

OTHER PUBLICATIONS

Chinese Notice of the first review opinion dated Sep. 26, 2025, in connection with Chinese Application No. 202211715544.7, with English translation thereof.
(Continued)

*Primary Examiner* — Lucy P Chien
(74) *Attorney, Agent, or Firm* — Wolf, Greenfield & Sacks, P.C.

(57) ABSTRACT

Provided are a near-eye display device and a near-eye display optical assembly. The near-eye display device includes a splicing display screen, a first optical element group, and a second optical element group. The splicing display screen includes an intermediate screen and a periphery screen; the orthographic projection of the periphery screen on a first plane surrounds the orthographic projection of the intermediate screen on the first plane; the first plane is a light exit surface of the near-eye display device; the resolution of the intermediate screen is higher than the resolution of the periphery screen. The first optical element group is disposed at a light exit side of the splicing display screen. The second optical element group is disposed at the light exit side of the splicing display screen; the second optical element group includes an intermediate portion and a periphery portion.

20 Claims, 13 Drawing Sheets

(56)               References Cited

U.S. PATENT DOCUMENTS

| | | |
|---|---|---|
| 2020/0233189 A1 | 7/2020 | Smith |
| 2022/0146853 A1 | 5/2022 | Gao et al. |

FOREIGN PATENT DOCUMENTS

| | | |
|---|---|---|
| CN | 205176383 U | 4/2016 |
| CN | 105807429 A | 7/2016 |
| CN | 207425256 U | 5/2018 |
| CN | 110308559 A | 10/2019 |
| CN | 114779475 A | 7/2022 |
| JP | H1123984 A | 1/1999 |
| WO | WO 98/10322 A1 | 3/1998 |
| WO | WO 2017/181361 A1 | 10/2017 |
| WO | WO 2018/094851 A1 | 5/2018 |
| WO | WO 2020/014707 A1 | 1/2020 |

OTHER PUBLICATIONS

International Search Report and Written Opinion for International Application No. PCT/CN2023/090808 mailed Sep. 7, 2023.

* cited by examiner

☒—0.4861 ☒—0.5876 ☒—0.6563

| F-Tan(Theta) Distortion | |
|---|---|
| 2022/12/28<br>Maximum Field is 47.500 Degrees.<br>Maximum distortion = 30.5912% | Zemax<br>Zemax OpticStudio 19.4 |
| | |

NEAR-EYE DISPLAY DEVICE AND NEAR-EYE DISPLAY OPTICAL ASSEMBLY

CROSS-REFERENCES TO RELATED APPLICATIONS

This is a National Stage Application, filed under 35 U.S.C. 371, of International Patent Application No. PCT/CN2023/090808, filed on April 26, 2023, which is based on and claims priority to Chinese Patent Application No. 202211715544.7 filed with the China National Intellectual Property Administration (CNIPA) on Dec. 29, 2022, the disclosure of which is incorporated herein by reference in its entirety.

TECHNICAL FIELD

Embodiments of the present application relate to head-mounted display technology, for example, a near-eye display device and a near-eye display optical assembly.

BACKGROUND

Near-eye display devices in related art typically employ two types of screens. One is a silicon-based substrate screen, and the other is a glass substrate screen. Since the silicon-based substrate screen is limited by screen size, it is difficult to enlarge the field of view of the screen, and the cost of the silicon-based substrate screen is relatively high. For the glass substrate screen, however, pixel size cannot be made small, and limited by the pixel size, it is difficult to achieve high resolution.

SUMMARY

The present application provides a near-eye display device and a near-eye display optical assembly to be compatible with the advantages of a glass-based screen and a silicon-based screen. Thus, high definition within a small field of view can be ensured, and a large field of view can be achieved.

Embodiments of the present application provide a near-eye display device. The device includes a splicing display screen, a first optical element group, and a second optical element group. The splicing display screen includes an intermediate screen and a periphery screen. The orthographic projection of the intermediate screen on a first plane is surrounded by the orthographic projection of the periphery screen on the first plane. The first plane is a light exit surface of the near-eye display device. The resolution of the intermediate screen is higher than the resolution of the periphery screen.

The first optical element group is disposed at a light exit side of the splicing display screen.

The second optical element group is disposed at the light exit side of the splicing display screen. The second optical element group includes an intermediate portion and a periphery portion. The orthographic projection of the intermediate portion on the first plane is surrounded by the orthographic projection of the periphery portion on the first plane.

The intermediate screen forms an intermediate image through the first optical element group and the intermediate portion of the second optical element group. The periphery screen forms a periphery image through the first optical element group and the periphery portion of the second optical element group. Adjacent edges of the intermediate image and the periphery image are stitched.

Embodiments of the present application provide a near-eye display optical assembly. The assembly includes a first optical element group and a second optical element group.

The first optical element group includes a first lens, a second lens, and a third lens. The first lens, the second lens, and the third lens are sequentially arranged along an optical axis. The first lens and the second lens form a lens group.

The second optical element group includes an intermediate portion and a periphery portion. The orthographic projection of the intermediate portion on an image plane is surrounded by the orthographic projection of the periphery portion on the image plane. The intermediate portion and the periphery portion are lenses.

The first optical element group and the second optical element group are sequentially arranged along the optical axis. The first optical element group and the second optical element group satisfy the following conditions:

$$1.431 < f_1/f_2 < 1.872;$$

$$1.037 < f_3/f_4 < 1.159.$$

$f_1$ denotes the focal length of the lens group. $f_2$ denotes the focal length of the third lens. $f_3$ denotes the focal length of the periphery portion. $f_4$ denotes the focal length of the intermediate portion.

Embodiments of the present application also provide a near-eye display optical assembly. The assembly includes a first optical element group and a second optical element group.

The first optical element group includes a first lens, a second lens, and a third lens. The first lens, the second lens, and the third lens are sequentially arranged along an optical axis. The first lens and the second lens form a lens group.

The second optical element group includes an intermediate portion and a periphery portion. The orthographic projection of the intermediate portion on the image plane is surrounded by the orthographic projection of the periphery portion on an image plane. The intermediate portion is a lens. The periphery portion is a plane mirror.

The second optical element group and the first optical element group are sequentially arranged along the optical axis. The first optical element group and the second optical element group satisfy the following conditions:

$$-0.608 < f_1/f_2 < -0.416;$$

$$-1.854 < f_1/f_3 < -1.354.$$

$f_1$ denotes the focal length of the intermediate portion. $f_2$ denotes the focal length of the lens group. $f_3$ denotes the focal length of the third lens.

DETAILED DESCRIPTION

Hereinafter the present application is described in conjunction with drawings and embodiments. Terms used in the embodiments of the present application are merely used to describe the specific embodiments and are not intended to limit the present application. Spatially related terms, including "on", "below", "left", and "right" described in the embodiments of the present application, are described from the perspective of the drawings and are not to be construed as a limitation to the embodiments of the present application. Additionally, in the context, when an element is formed "on" or "below" another element, the element can not only be directly formed "on" or "below" the other element but also be indirectly formed "on" or "below" the other element via an intermediate element. Terms such as "first" and "second" are used only for description to distinguish between different components and not to indicate any order, quantity, or importance. For those of ordinary skill in the art, specific meanings of the preceding terms in the present application can be construed depending on specific contexts.

As used herein, the term "include" and variations thereof are intended to be inclusive, that is, "including, but not limited to". The term "based on" is "at least partially based on". The term "an embodiment" indicates "at least one embodiment".

Concepts such as "first" and "second" in the present application are used to distinguish between corresponding content and are not intended to limit the order or mutual dependence.

Figure 1:
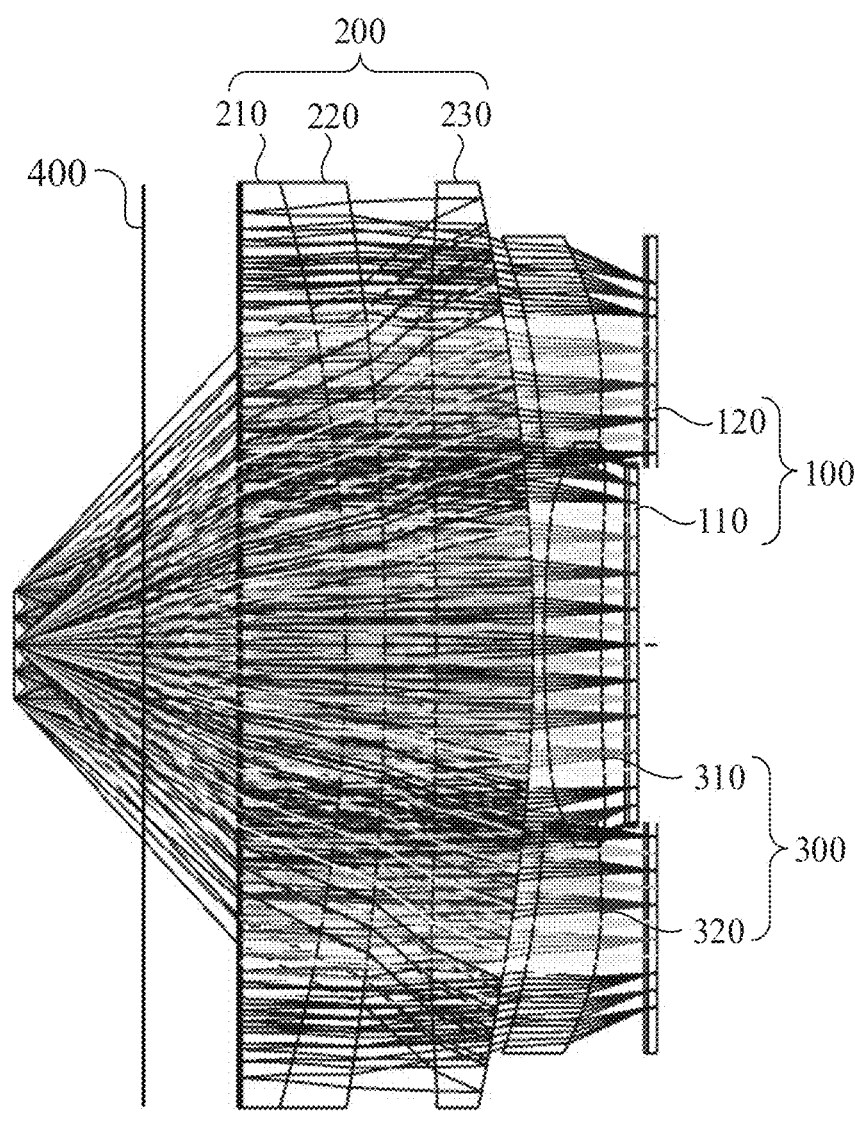
FIG. 1 is a diagram illustrating the structure of a near-eye display device according to embodiment one of the present application.

References to modifications of "one" or "a plurality" mentioned in the present application are intended to be illustrative and not limiting; those skilled in the art should understand that "one" or "a plurality" should be understood as "one or more" unless clearly expressed in the context. FIG. 1 is a diagram illustrating the structure of a near-eye display device according to embodiment one of the present application. With reference to FIG. 1, the near-eye display device includes a splicing display screen 100, a first optical element group 200, and a second optical element group 300. The splicing display screen 100 includes an intermediate screen 110 and a periphery screen 120, the orthographic projection of the intermediate screen 110 on a first plane 400 is surrounded by the orthographic projection of the periphery screen 120 on the first plane 400. The first plane 400 is a light exit surface of the near-eye display device, and the resolution of the intermediate screen 110 is higher than the resolution of the periphery screen 120. In FIG. 1, the first optical element group 200 is disposed at a light exit side of the splicing display screen 100, the second optical element group 300 is disposed at the light exit side of the splicing display screen 100, and the second optical element group 300 includes an intermediate portion 310 and a periphery portion 320. The orthographic projection of the intermediate portion 310 on the first plane 400 is surrounded by the orthographic projection of the periphery portion 320 on the first plane 400. The intermediate screen 110 forms an intermediate image through the first optical element group 200 and the intermediate portion 310 of the second optical element group 300, the periphery screen 120 forms a periphery image through the first optical element group 200 and the periphery portion 320 of the second optical element group 300, and adjacent edges of the intermediate image and the periphery image are stitched.

The splicing display screen 100 refers to a display screen composed of two display screens formed by splicing two display screens together. The intermediate screen 110 and the periphery screen 120 in the splicing display screen 100 may form a full-surface display screen by reasonable position arrangement. The intermediate screen 110 is a screen located in the middle, and the periphery screen 120 is disposed around the intermediate screen 110. The projection of the periphery screen 120 surrounds the projection of the intermediate screen 110 with the light exit surface of the near-eye display device as a projection surface. Thus, a complete light exit surface can be formed on the projection surface. The periphery screen 120 may be an annular screen surrounding the intermediate screen 110. The periphery screen 120 may also include multiple screens surrounding the intermediate screen 110.

Corresponding optical imaging elements are also disposed in the near-eye display device to achieve near-eye display. Optionally, the near-eye display device includes a first optical element group 200 and a second optical element group 300. The first optical element group 200 is a complete optical element. Serving as an optical element shared by the intermediate screen 110 and the periphery screen 120, the first optical element group 200 is responsible for simultaneously diverging or converging light emitted by the intermediate screen 110 and the periphery screen 120. The second optical element group 300, similar to the splicing display screen 100, is also an optical element in a spliced form. The second optical element group 300 is divided into an intermediate portion 310 and a periphery portion 320. Similarly, on the projection surface, the projection of the intermediate portion 310 is surrounded by the projection of the periphery portion 320, the intermediate portion 310 is responsible for converging or diverging the light from the intermediate screen 110, and the periphery portion 320 is responsible for converging or diverging the light from the periphery screen 120. Thus, an image is formed by the intermediate screen 110 via the intermediate portion 310 and the first optical element group 200, and an image is formed by the periphery screen 120 via the periphery portion 320 and the first optical element group 200. In this embodiment of the present application, by reasonable arrangement of the optical properties of the intermediate portion 310, the periphery portion 320, and the first optical element group 200, it can be ensured that images formed by the intermediate screen 110 and the periphery screen 120, that is, the intermediate image and the periphery image, can be stitched at adjacent edges, thereby completing image splicing and forming a complete picture.

In the preceding technical solution, a splicing display screen, a first optical element group disposed on the light exit side of the splicing display screen, and a second optical element group disposed on the light exit side of the splicing display screen are arranged. The splicing display screen includes an intermediate screen and a periphery screen, the orthographic projection of the periphery screen on a first plane surrounds the orthographic projection of the intermediate screen on the first plane, and the first plane is a light exit surface of the near-eye display device. The resolution of the intermediate screen is higher than the resolution of the periphery screen, the second optical element group includes an intermediate portion and a periphery portion, and the orthographic projection of the periphery portion on the first plane surrounds the orthographic projection of the intermediate portion on the first plane. The intermediate screen forms an intermediate image through the first optical element group and the intermediate portion of the second optical element group, the periphery screen forms a periphery image through the first optical element group and the periphery portion of the second optical element group, and adjacent edges of the intermediate image and the periphery image are stitched. Thus, near-eye display of a complete image is achieved. This embodiment of the present application solves the problem in the related art that the near-eye display device is not compatible with a large field of view and high resolution. In this application, high definition can be achieved through an intermediate screen within a small field of view where the human eye is sensitive, and a large field of view can be achieved by using a periphery screen. Thus, users' needs are met, and the cost of near-eye display devices is reduced.

Optionally, in the preceding embodiment, the intermediate screen 110 may be a silicon-based organic light-emitting diode (OLED) screen, and the periphery screen 120 may be a liquid crystal display (LCD) screen. Taking advantage of high resolution of silicon-based OLED screens can achieve high definition in the middle field of view where the human eye is highly sensitive. Using LCD can reduce the cost of the entire near-eye display device and ensure a large field of view of the entire near-eye display device.

For the first optical element group 200, in an optional embodiment, the first optical element group may be configured to include a first lens 210, a second lens 220, and a third lens 230. The first lens 210, the second lens 220, and the third lens 230 are sequentially arranged on an optical path of light exit of the splicing display screen 100. Optionally, the first lens 210 may be a plano-convex lens, the second lens 220 may be concave-convex lens, and the third lens 230 may be a biconvex lens.

In an optional embodiment, the first lens 210 and the second lens 220 may be configured to form a lens group. Optionally, one surface of the first lens 210 facing to the second lens 220 and one surface of the second lens 220 facing to the first lens 210 are glued to each other to form a glued lens group. By using the glued lens group, the distance between the lenses can be reduced, the volume of the overall near-eye display device can be reduced to a certain extent, and miniaturization is facilitated. Moreover, the chromatic aberration can be corrected appropriately, the field curvature and coma can be reduced, and the imaging quality can be further optimized. The third lens 230 may be configured as an aspherical lens in this embodiment of the present application. With the aspherical third lens 230, aberrations such as field curvature, chromatic aberration, and distortion can be further reduced so that the imaging aberrations of the intermediate screen 110 and the imaging aberrations of the periphery screen 120 can be corrected and balanced, the imaging quality of different field of view regions is ensured, and the imaging difference between the intermediate screen 110 and the periphery screen 120 is reduced. Thus, the imaging is more coherent, and users' sensory experience is improved.

Optionally, in this embodiment of the present application, the intermediate screen 110 and the periphery screen 120 may be configured to be misaligned in a direction parallel to the first plane 400 and misaligned in a direction of an optical axis of light exit of the near-eye display device. Optionally, the distance between the intermediate screen 110 and the periphery screen 120 in the direction parallel to the first plane 400 may be configured to be less than or equal to 1 mm.

A certain gap may exist between the intermediate screen 110 and the periphery screen 120 so that a drive module and leads can be conveniently accommodated and assembled in a limited space. Additionally, considering that the distance between the intermediate screen 110 and the periphery screen 120 has a negative effect on imaging splicing, the upper limit of the distance between the two screens on the light exit surface is limited to 1 mm. In this manner, the situation is avoided where imaging splicing cannot be achieved because the distance between the two screens is too large. In other words, the design difficulty of optical imaging elements can be reduced to ensure the imaging splicing effect.

In the preceding embodiment, the field of view of the intermediate screen 110 may be configured to be less than or equal to ±25°. The high-resolution imaging of the intermediate screen 110 in the middle small field of view can meet users' need for sensitivity to the definition of the middle field of view region. Additionally, splicing of two screen images within a small field of view also helps reduce the design difficulty of optical imaging elements and facilitate the implementation of imaging splicing. Moreover, the field of view of the intermediate screen 110 is less than ±25° so that the area of the intermediate high-resolution screen can be reduced, the proportion of the low-resolution screen in the entire screen can be increased, and the cost can be reduced to a certain extent.

Optionally, the second optical element group 300 in this embodiment of the present application may be disposed on one side of the first optical element group 200 facing towards or facing away from the splicing display screen 100. It can be understood that the position of the optical element groups is also decisive in the overall imaging process. In the preceding embodiments of the two arrangements, those skilled in the art may adaptively design the optical properties of each optical element group according to the specific position of the second optical element group 300 to ensure the imaging and image splicing effects of the intermediate screen 110 and the periphery screen 120 in the splicing display screen 100.

Optionally, the periphery portion 320 and the intermediate portion 310 are aspherical lenses in the case where the second optical element group 300 is disposed on one side of the first optical element group 200 facing towards the splicing display screen 100, and the intermediate portion 310 and the periphery portion 320 are lenses. Optionally, the intermediate portion 310 is an aspherical lens in the case where the second optical element group 300 is disposed on one side of the first optical element group 200 facing away from the splicing display screen 100, the intermediate portion 310 is a lens and the periphery portion 320 is a plane mirror.

Examples are used where near-eye display devices of the two preceding arrangements are described below with reference to specific embodiments. In one embodiment, the intermediate portion 310 of the second optical element group 300 and the periphery portion 320 of the second optical element group 300 are both lenses, and the focal length of the intermediate portion 310 of the second optical The distance between the lenses in the first optical element group 200 is configured to satisfy that $1.431 < f_1/f_2 < 1.872$, that is, the focal length ratio of the lens group formed by the first lens 210 and the second lens 220 to the third lens 230 is defined. Essentially, the optical power ratio between the lenses in the first optical element group 200 is limited so that the light refraction capability of the lens group formed by the first lens 210 and the second lens 220 and the third lens 230 in the entire first optical element group 200 is limited. Through the light refraction cooperation of the two-part elements, imaging of the intermediate screen and the periphery screen can be achieved. For the second optical element group 300, the lenses in the second optical element group 300 are configured to satisfy that $1.037 < f_3/f_4 < 1.159$, that is, the focal length ratio of the two lenses is defined. Essentially, the light convergence capability of the two lenses for the intermediate screen 110 and the periphery screen 120 is limited to cooperate with the first optical element group 200 to achieve independent clear imaging of the intermediate screen 110 and the periphery screen 120 and ensure the splicing effect of the intermediate image and the periphery image.

The present application also provides parameter design values for lenses for this specific embodiment, as described in Table 1.

TABLE 1

| | Design Values of Multiple Lenses in Embodiment One of the Present Application | | | | | |
|---|---|---|---|---|---|---|
| Surface Serial Number | Surface Type | Radius of Curvature | Thickness (Intermediate Portion) | Thickness (Periphery Portion) | Refractive Index | Abbe Number |
| S1 | Standard Surface | Infinity | 8.118 | | 1.62 | 60.4 |
| S2 | Standard Surface | −112.346 | 3.000 | | 1.95 | 17.9 |
| S3 | Standard Surface | −181.135 | 4.140 | | | |
| S4 | Aspherical Surface | −943.125 | 7.853 | | 1.54 | 56.3 |
| S5 | Aspherical Surface | −126.357 | 0.500 | | | |
| S6 | Aspherical Surface | −220.568 | / | 3.564 | 1.54 | 56.3 |
| S7 | Aspherical Surface | 51.267 | | 2.777 | | |
| S8 | Aspherical Surface | 74.826 | 3.564 | / | 1.54 | 56.3 |
| S9 | Aspherical Surface | 228.546 | 0.977 | | | | element group 300 is different from the focal length of the periphery portion 320 of the second optical element group 300.

With continued reference to FIG. 1, in a specific embodiment, the second optical element group 300 is disposed on one side of the first optical element group 200 facing towards the splicing display screen 100, and the intermediate portion 300 and periphery portion 200 are lenses. The first optical element group 200 and the second optical element group 300 satisfy the following conditions: $1.431 < f_1/f_2 < 1.872$; $1.037 < f_3/f_4 < 1.159$. $f_1$ denotes the focal length of the lens group formed by the first lens 210 and the second lens 220. $f_2$ denotes the focal length of the third lens 230. $f_3$ denotes the focal length of the periphery portion 320 of the second optical element group 300. $f_4$ denotes the focal length of the intermediate portion 310 of the second optical element group 300.

The surface serial numbers in Table 1 are numbered according to the surface order of each lens. "S1" denotes the front surface of the first lens 210. "S2" denotes the rear surface of the first lens 210 and the front surface of the second lens. S3 denotes the rear surface of the second lens. S4 denotes the front surface of the third lens. S5 denotes the rear surface of the third lens. "S6" denotes the front surface of the periphery portion 320. "S7" denotes the rear surface of the periphery portion 320. "S8" denotes the front surface of the intermediate portion 310. "S9" denotes the rear surface of the intermediate portion 310. The radius of curvature represents the degree of curvature of the surface of the lens. A positive value represents that the surface is curved toward the image plane side. A negative value represents that the surface is curved toward the object plane side. "Infinity" represents that the surface is a plane and that the radius of curvature is infinite. The thickness represents the central axial distance from the current surface to the next surface. The thickness of "S6" represents the distance between the rear surface of the third lens 230 and the front surface of the periphery portion 320. The thickness of "S7" represents the distance between the rear surface of the periphery portion 320 and the front surface of the periphery screen 120. The thickness of "S8" represents the distance between the rear surface of the third lens 230 and the front surface of the intermediate portion 310. The thickness of "S9" represents the distance between the rear surface of the intermediate portion 310 and the front surface of the intermediate screen 110. The refractive index represents the ability of the material between the current surface and the next surface to deflect light. The Abbe number represents the dispersion properties of a material from the current surface to the next surface to light.

The aspheric conical coefficient may be defined by the following aspheric formula but is not limited to the following expression:

$$Z = \left( \frac{c * x^2}{1 + \left(1 - (1 + k) * (c^2) * (x^2)\right)^{0.5}} \right) + \left(a_2 * x^2\right) + \left(a_4 * x^4\right) +$$

$$\left(a_6 * x^6\right) + \left(a_8 * x^8\right) + \left(a_{10} * x^{10}\right) + \left(a_{12} * x^{12}\right) + \left(a_{14} * x^{14} + \left(a_{16} * x^{16}\right).$$

z denotes the sagittal height of an aspherical surface. c denotes the basic curvature at the vertex. k denotes the constant of a conic curve. x denotes the radial coordinate perpendicular to the optical axis direction. $a_{2i}$ denotes the high-order term coefficient. $a_{2i}x^{2i}$ denotes the high-order term of the aspherical surface. 2i denotes the order of the aspherical surface. i=1, 2, 3, 4, 5, 6, 7, or 8. The aspherical formula parameters of the preceding aspherical lenses are described in Table 2.

screen 120 may be configured to partially overlap, and the image height of an overlapped region is greater than or equal to 700 μm.

In an embodiment of the present application, the adjacent edges of the intermediate image formed by the intermediate screen 110 and the periphery image formed by the periphery screen 120 may be configured to partially overlap. The intermediate screen 110 includes a first pixel, the periphery screen 120 includes a second pixel, imaging of the first pixel is the same as imaging of the second pixel, and the difference between the field of view of the first pixel and the field of view of the second pixel is less than or equal to 0.098°.

Figure 2:
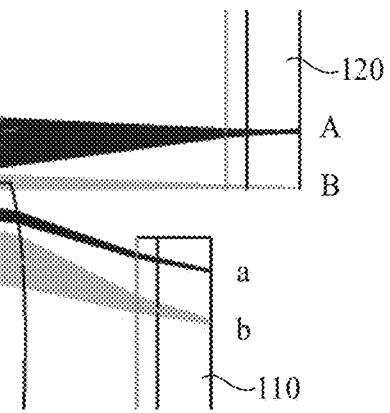
FIG. 2 is a partially enlarged view of the near-eye display device according to embodiment one of the present application.

As shown in FIG. 2, in embodiment one, an image formed between two points a and b in the edge region of the intermediate screen 110 intersects with an image formed between two points A and B in the edge region of the periphery screen 120, and the image height of the image between point A and point B is 700 μm. In such way, the images of the intermediate screen 110 and the periphery screen 120 are ensured to have an overlapped region of a certain width. Additionally, as described in Table 3, the fields of view of the four points A, B, a, and b that are disposed at the edges of the intermediate screen 110 and the periphery screen 120 and whose formed images overlap are all in the range of ±25° in embodiment one, which ensures the users' need for sensitivity to the definition of the middle field of view region. Additionally, splicing of two screen images within a small field of view also helps reduce the design difficulty of optical imaging elements and facilitate the implementation of imaging splicing. Additionally, the difference between the fields of view of point A and point a whose imaging overlaps is −0.005°, and the difference between the fields of view of point B and point b whose imaging overlaps is 0.056°. The two differences are both

TABLE 2

Conic Coefficients of Aspherical Lenses and Multi-order Coefficients of Aspherical Surfaces

| Surface Serial Number | R | conic | 4 | 6 | 8 | 10 | 12 | 14 | 16 |
|---|---|---|---|---|---|---|---|---|---|
| S4 | −9.43E+02 | −7.20E+00 | −1.75E−06 | 3.97E−09 | −4.48E−12 | 6.57E−15 | −4.73E−18 | 1.01E−21 | −7.45E−26 |
| S5 | −1.26E+02 | 6.75E+00 | 2.39E−07 | 8.69E−10 | −9.52E−13 | 1.24E−15 | 6.31E−20 | −7.25E−22 | 2.00E−25 |
| S6 | −2.20E+02 | 4.31E+01 | −1.28E−06 | 2.09E−10 | 5.55E−14 | −5.56E− 17 | 2.35E−19 | −3.81E−23 | −6.56E−26 |
| S7 | 5.12E+01 | −4.10E+01 | −1.74E− 06 | −7.25E−09 | −8.22E−13 | 1.04E−15 | 3.96E−18 | 6.17E−23 | −1.42E−24 |
| S8 | 7.48E+01 | 2.23E+01 | −3.63E−05 | 1.85E−07 | 3.39E−10 | 1.15E −12 | −5.27E−16 | −8.23E−18 | −2.33E−19 |
| S9 | 2.28E+02 | −9.90E+01 | 5.96E−06 | −2.94E−09 | −9.41E−11 | −6.77E−13 | −1.30E−15 | −1.22E−18 | −2.37E−20 |

FIG. 2 is a partially enlarged view of the near-eye display device according to embodiment one of the present application. With reference to FIGS. 1 and 2, imaging parameters of the adjacent boundaries of the intermediate screen 110 and the periphery screen 120 are described in Table 3.

TABLE 3

Local Imaging Parameters of the Near-eye Display Device Shown in Embodiment One of the Present Application

| Location | A | a | B | b |
|---|---|---|---|---|
| FOV (°) | 23.110 | 23.115 | 21.957 | 21.901 |
| Difference (°) | | −0.005 | | 0.056 |

In an embodiment of the present application, the adjacent edges of the intermediate image formed by the intermediate screen 110 and the periphery image formed by the periphery smaller than 0.098°, which ensures the image overlapping effect. In summary, by the configuration of the overlap of some image regions and the limit of the upper limit of the difference between the fields of view of the overlapping pixels, it is possible to make the imaging regions more coherent and to ensure the imaging splicing effect of the intermediate screen 110 and the periphery screen 120, thereby ensuring the user experience.

Figure 3:
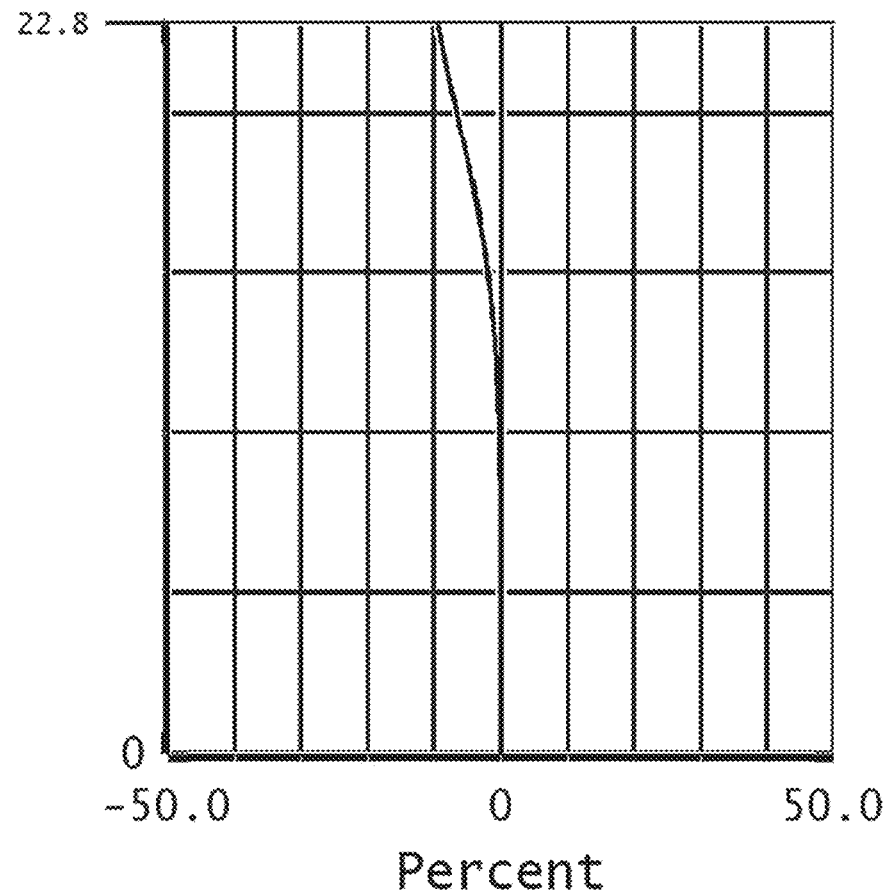
FIG. 3 is a diagram illustrating the distortion of an intermediate screen of the near-eye display device according to embodiment one of the present application.
Figure 4:
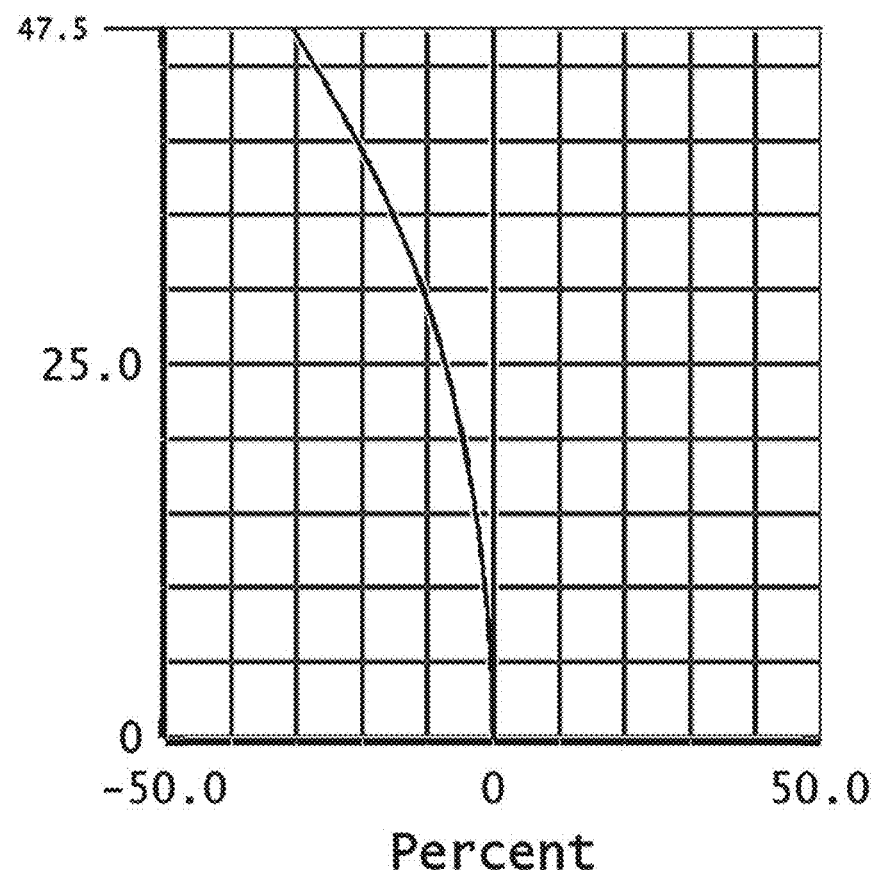
FIG. 4 is a diagram illustrating the distortion of a periphery screen of the near-eye display device according to embodiment one of the present application.
Figure 5:
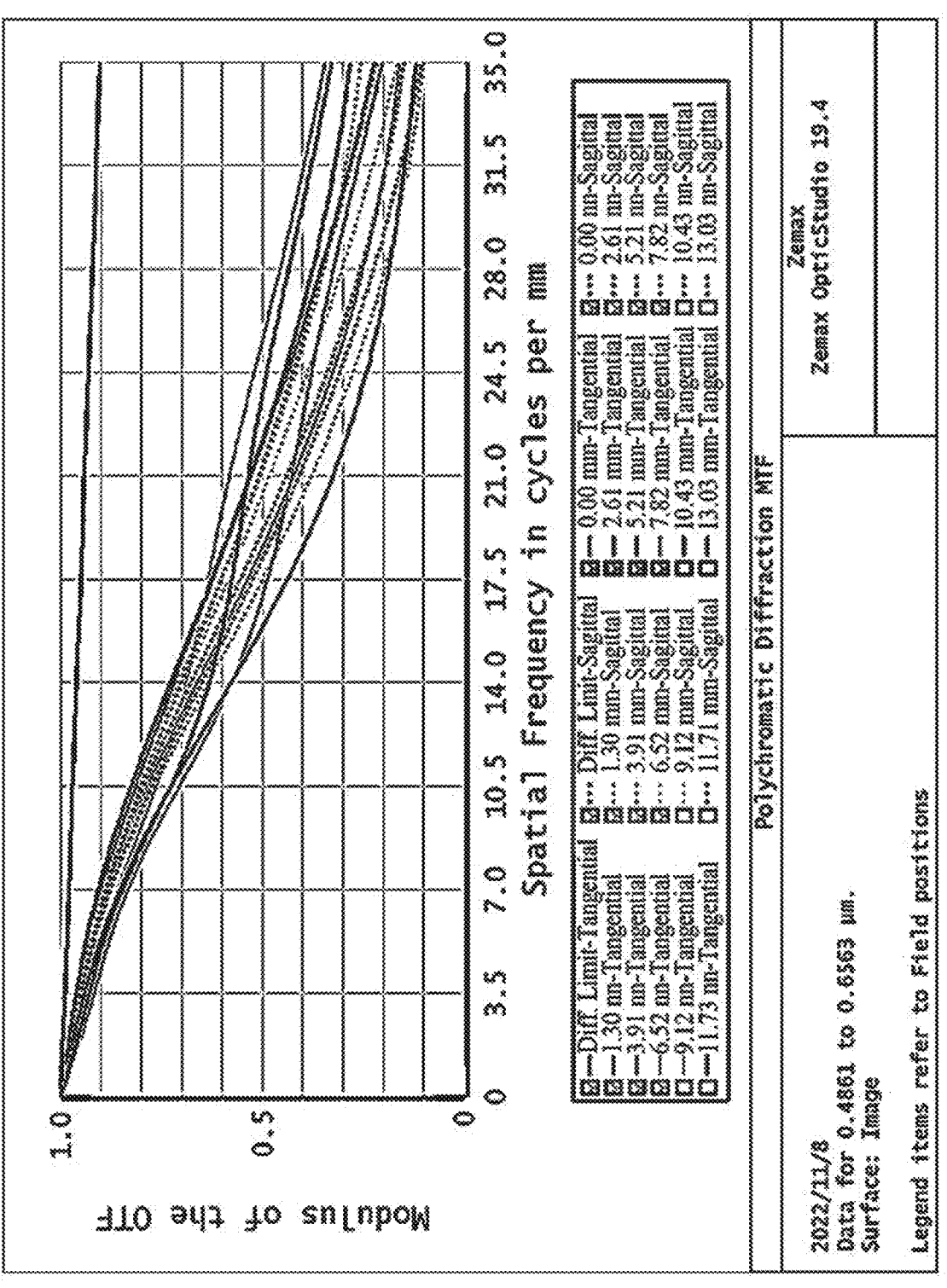
FIG. 5 is a modulation transfer function (MTF)diagram of the intermediate screen of the near-eye display device according to embodiment one of the present application.
Figure 6:
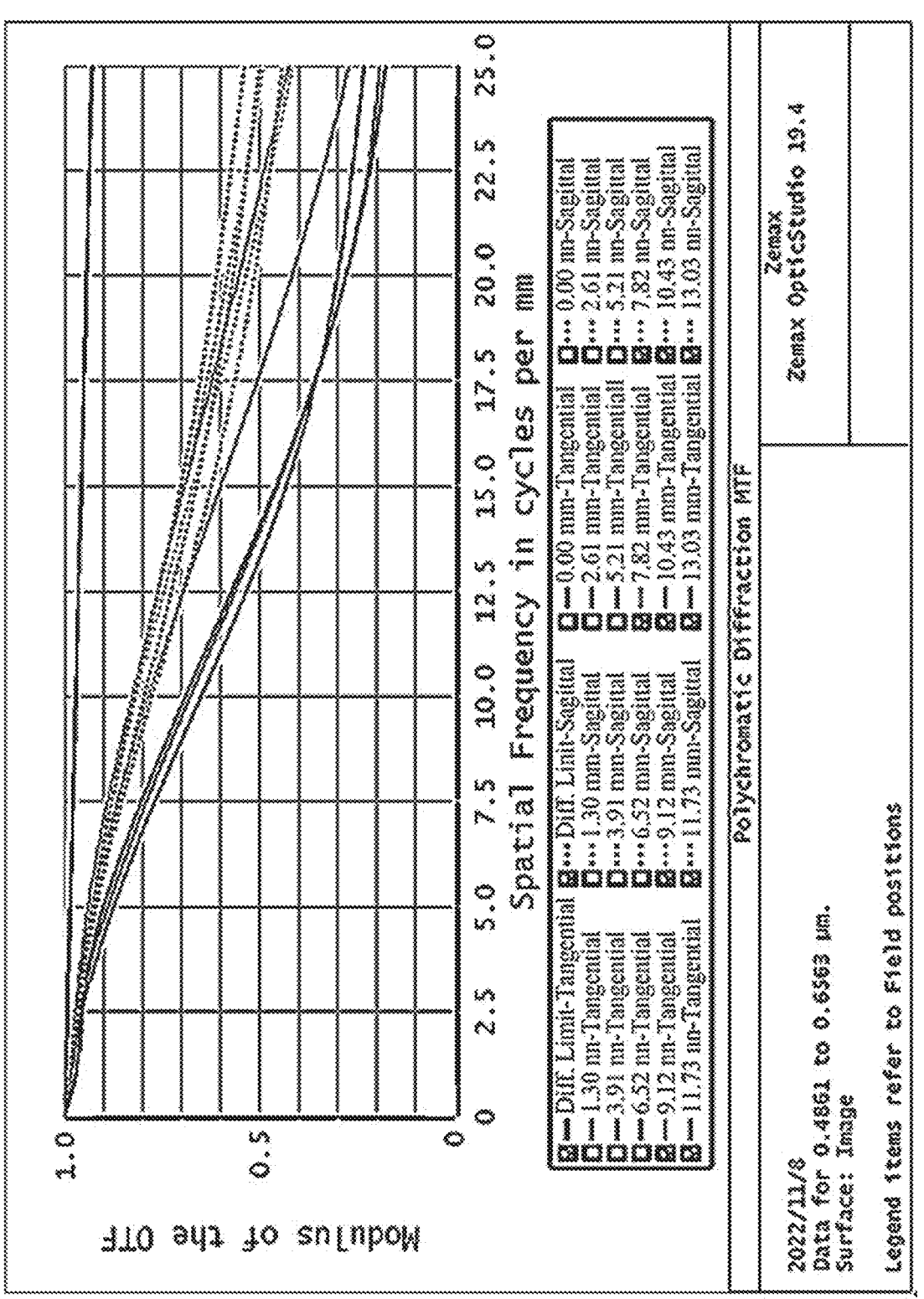
FIG. 6 is an MTF diagram of the periphery screen of the near-eye display device according to embodiment one of the present application.
Figure 7:
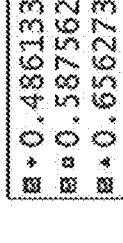
FIG. 7 is a spot diagram of the periphery screen of the near-eye display device according to embodiment one of the present application.

FIG. 3 is a diagram illustrating the distortion of an intermediate screen of the near-eye display device according to embodiment one of the present application. FIG. 4 is a diagram illustrating the distortion of a periphery screen of the near-eye display device according to embodiment one of the present application. FIG. 5 is a modulation transfer function (MTF) diagram of the intermediate screen of the near-eye display device according to embodiment one of the present application. FIG. 6 is an MTF diagram of the periphery screen of the near-eye display device according to embodiment one of the present application. FIG. 7 is a spot diagram of the periphery screen of the near-eye display device according to embodiment one of the present application. In FIGS. 3 and 4, the abscissa represents the distortion variable in percent, and the ordinate represents the field of view in degrees. As shown in FIGS. 3 and 4, in the near-eye display device in this embodiment, the maximum distortion of the intermediate screen 110 is 9.4545%, which is smaller than ±9.5%, while the maximum distortion of the periphery screen 120 is 30.4379%, which is smaller than ±30.5%. The preceding indicates that the imaging system has a better distortion optical performance, that is, the near-eye display device provided in embodiment one of the present application has a good imaging effect. FIGS. 5 and 6 are diagrams illustrating the modulation transfer function. The abscissa in FIGS. 5 and 6 is the spatial frequency in cycles per mm, and the ordinate is the MTF (Modulus of the OTF) value. As shown in FIGS. 5 and 6, the near-eye display device has a high transfer function in the 0-0.6 field of view of the intermediate screen 110 and the 0.7-1.0 field of view of the periphery screen 120, indicating that the near-eye display device can acquire good resolution capability in both the center field of view and the edge field of view and can meet the resolution requirement of a large field of view. FIG. 7 is a spot diagram showing the spot distribution of 11 field of view locations (14.033 mm to 26.576 mm) at different wavelengths (0.486μ., 0.588μ., and 0.656 μm). The maximum value of the root mean square radius (RMS radius) of the 11 field of view locations is 30.925. In other words, it can be seen from the spot diagram of the periphery screen 120 shown in FIG. 7 that the imaging ranges of different wavelengths of the near-eye display device at different fields of view are all within ±31 μm, which ensures that the aberrations of different field of view regions differ slightly, that is, the near-eye display device better corrects the aberrations of the optical system and has better imaging quality.

An embodiment of the present application also provides a near-eye display optical assembly. With continued reference to FIG. 1, the near-eye display optical assembly includes a first optical element group 200, the first optical element group 200 includes a first lens 210, a second lens 220, and a third lens 230, the first lens 210, the second lens 220, and the third lens 230 are sequentially arranged along an optical axis, and the first lens 210 and the second lens 220 form a lens group. Optionally, one surface of the first lens 210 facing to the second lens 220 and one surface of the second lens 220 facing to the first lens 210 are glued to each other to form a glued lens group. The near-eye display optical assembly also includes a second optical element group 300. The second optical element group 300 includes an intermediate portion 310 and a periphery portion 320. The orthographic projection of the intermediate portion 310 on the image plane is surrounded by the orthographic projection of the periphery portion 320 on an image plane. The intermediate portion 310 and the periphery portion 320 are lenses.

The first optical element group 200 and the second optical element group 300 are sequentially arranged along the optical axis. The first optical element group 200 and the second optical element group 300 satisfy the following conditions:

$$1.431 < f_1/f_2 < 1.872.$$

$$1.037 < f_3/f_4 < 1.159.$$

$f_1$ denotes the focal length of the lens group formed by the first lens 210 and the second lens 220. $f_2$ denotes the focal length of the third lens 230. $f_3$ denotes the focal length of the periphery portion 320. $f_4$ denotes the focal length of the intermediate portion 310.

The preceding near-eye display device includes the near-eye display optical assembly shown in this embodiment. The working principles and working processes of the near-eye display optical assembly and the near-eye display device are the same or similar. The near-eye display optical assembly has the same or similar effects as the near-eye display device, which is not repeated herein.

Figure 8:
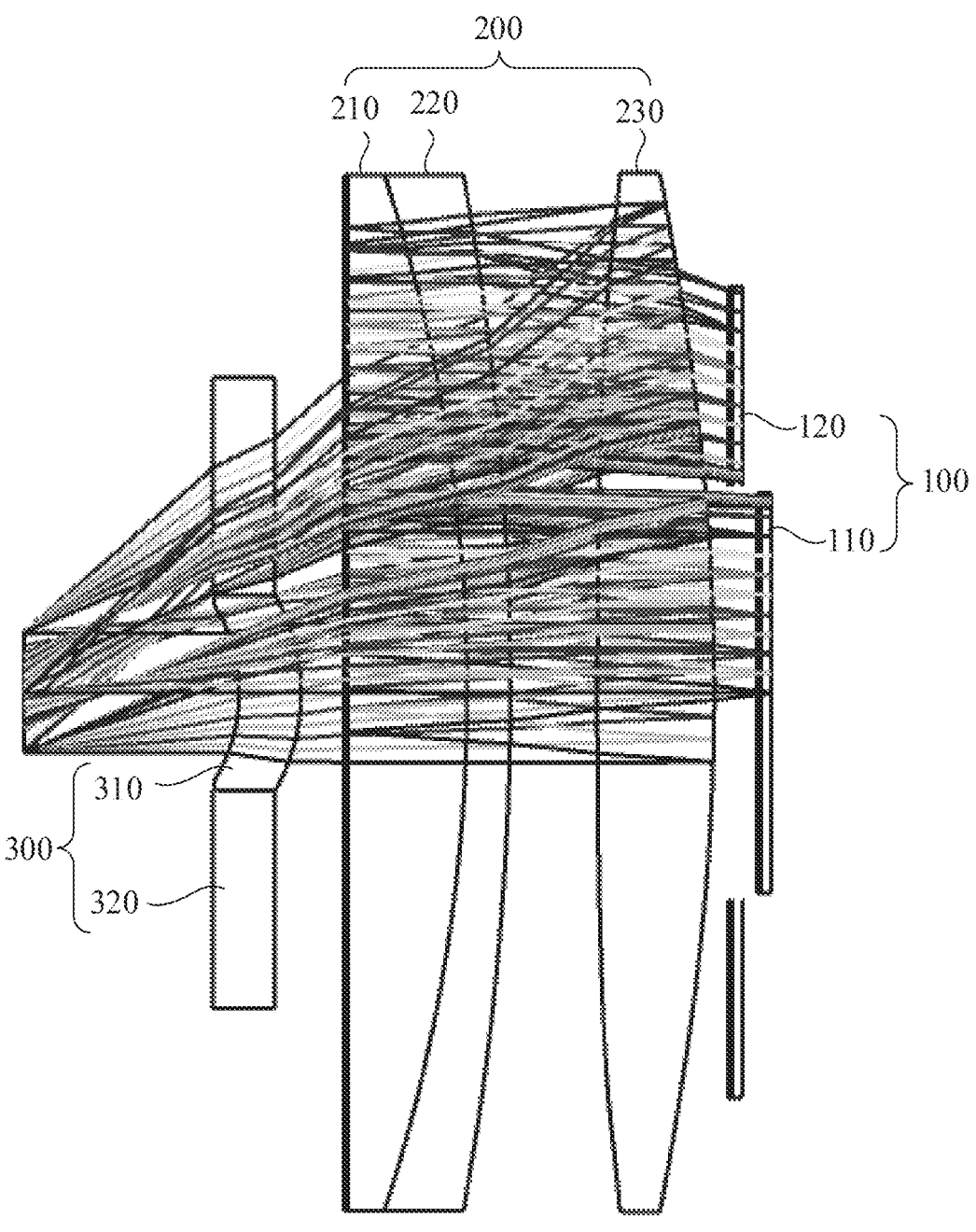
FIG. 8 is a diagram illustrating the structure of a near-eye display device according to embodiment two of the present application.

FIG. 8 is a diagram illustrating the structure of a near-eye display device according to embodiment two of the present application. With reference to FIG. 8, in another specific embodiment of the present application, the second optical element group 300 is optionally disposed on one side of the first optical element group 200 facing away from the splicing display screen 100, the intermediate portion 310 is a lens, and the periphery portion 320 is a plane mirror. Then, the first optical element group 200 and the second optical element group 300 satisfy the following conditions: $-0.608 < f_1/f_2 < -0.416$; $-1.854 < f_1/f_3 < -1.5341.159$. $f_1$ denotes the focal length of the intermediate portion 310. $f_2$ denotes the focal length of the lens group formed by the first lens 210 and the second lens 220. $f_3$ denotes the focal length of the third lens 230.

The focal length proportional relationship between the intermediate portion 310, the lens group formed by the first lens 210 and the second lens 220, and the third lens 230 is configured. Essentially, the roles of the intermediate portion 310, the lens group and the third lens 230 in the entire imaging optical path are defined, that is, the optical power distribution of the intermediate portion 310, the lens group and the third lens 230 is defined. In this manner, the intermediate portion 310, the lens group and the third lens 230 can clearly image the intermediate screen 110 by reasonable optical power cooperation, and the periphery screen 120 can be clearly imaged by the lens group formed by the first lens 210 and the second lens 220 and the third lens 230 so that the intermediate image and the periphery image are spliced.

The present application also provides parameter design values for lenses for this specific embodiment, as described in Table 4.

TABLE 4

Design Values of Multiple Lenses in Embodiment Two of the Present Application

| Surface Serial Number | Surface Type | Radius of Curvature | Thickness (Intermediate Portion) | Thickness (Periphery Portion) | Refractive Index | Abbe Number |
|---|---|---|---|---|---|---|
| S1 | Aspherical Surface/ | −11.100 | 5.068 | 4.337 | 1.54 | 56.3 |

TABLE 4-continued

| | | | Thickness | Thickness | | |
|---|---|---|---|---|---|---|
| Surface Serial Number | Surface Type | Radius of Curvature | (Intermediate Portion) | (Periphery Portion) | Refractive Index | Abbe Number |
| S2 | Standard Surface Aspherical Surface/ Standard Surface | −12.900 | 2.125 | 4.154 | | |
| S3 | Standard Surface | Infinity | 8.250 | | 1.62 | 60.4 |
| S4 | Standard Surface | −116.732 | 3.000 | | 1.95 | 17.9 |
| S5 | Standard Surface | −215.167 | 3.893 | | | |
| S6 | Aspherical | 754.125 | 9.800 | | 1.54 | 56.3 |
| S7 | Aspherical | −147.554 | 3.292 | 0.300 | | |

Design Values of Multiple Lenses in Embodiment Two of the Present Application

The surface serial numbers in Table 4 are numbered according to the surface order of each lens. "S1" denotes the front surface of the intermediate portion 310 and the periphery portion 320 of the second optical element group 300. "S2" denotes the rear surface of the intermediate portion 310 and the periphery portion 320 of the second optical element group 300. S3 denotes the front surface of the first lens. S4 denotes the rear surface of the first lens and the front surface of the second lens. S5 denotes the rear surface of the second lens. S6 denotes the front surface of the third lens. S7 denotes the rear surface of the third lens. The radius of curvature represents the degree of curvature of the surface of the lens. A positive value represents that the surface is curved toward the image plane side. A negative value represents that the surface is curved toward the object plane side. "Infinity" represents that the surface is a plane and that the radius of curvature is infinite. The thickness represents the central axial distance from the current surface to the next surface. The thickness of "S1" represents the distance between the front surface and the rear surface of the intermediate portion 310 or the distance between the front light. The Abbe number represents the dispersion properties of a material from the current surface to the next surface to light.

The aspheric conical coefficient may be defined by the following aspheric formula but is not limited to the following expression:

$$Z = \left( \frac{c * x^2}{1 + \left(1 - (1 + k) * \left(c^2\right) * \left(x^2\right)\right)^{0.5}} \right) + \left(a_2 * x^2\right) + \left(a_4 * x^4\right) + \left(a_6 * x^6\right) + \left(a_8 * x^8\right) + \left(a_{10} * x^{10}\right) + \left(a_{12} * x^{12}\right) + \left(a_{14} * x^{14} + \left(a_{16} * x^{16}\right).$$

z denotes the sagittal height of an aspherical surface. c denotes the basic curvature at the vertex. k denotes the constant of a conic curve. x denotes the radial coordinate perpendicular to the optical axis direction. $a_{2i}$ denotes the high-order term coefficient. $a_{2i}x^{2i}$ denotes the high-order term of the aspherical surface. The aspherical formula parameters of the preceding aspherical lenses are described in Table 5.

TABLE 5

Conic Coefficients of Aspherical Lenses and Multi-order Coefficients of Aspherical Surfaces

Figure 9:
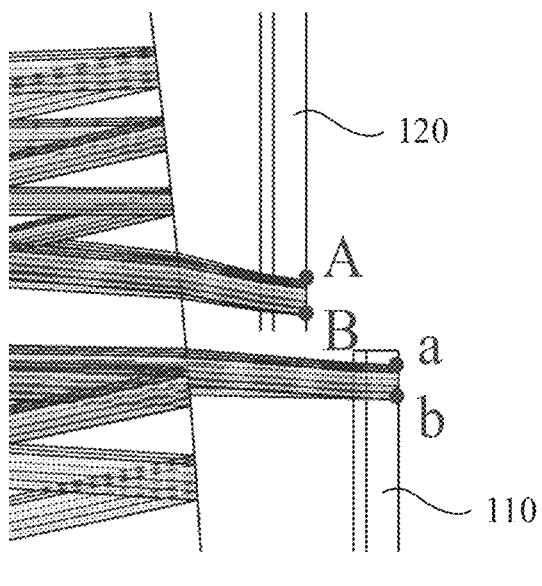
FIG. 9 is a partially enlarged view of the near-eye display device according to embodiment two of the present application.

| Surface Serial Number | R | conic | 4 | 6 | 8 | 10 | 12 | 14 | 16 |
|---|---|---|---|---|---|---|---|---|---|
| S1 | −1.11E+01 | 9.06E−01 | 7.24E−06 | 7.15E−06 | −1.71E−07 | −4.38E−08 | 4.07E−09 | −1.32E−10 | 1.52E−12 |
| S2 | −1.29E+01 | 1.01E+00 | −2.59E−06 | 6.07E−06 | −2.46E−07 | 1.06E−09 | 2.33E−10 | −6.28E−12 | 5.00E−14 |
| LS6 | 7.54E+02 | 9.90E+01 | −1.85E−07 | 3.10E−09 | −6.40E−12 | 7.37E−15 | −4.12E−18 | 9.38E−22 | −1.23E−25 |
| LS7 | −1.47E+02 | 8.70E+00 | 3.24E−07 | 7.37E−10 | −8.83E−13 | 5.95E−16 | 2.73E−19 | −4.26E−22 | 9.04E−26 | surface and the rear surface of the periphery portion 320. The thickness of "S2" represents the distance between the rear surface of the intermediate portion 310 or the periphery portion 320 and the front surface of the first lens 210. The thickness of "S6" represents the distance between the rear surface of the third lens 230 and the front surface of the intermediate screen 110. The thickness of "S7" represents the distance between the rear surface of the third lens 230 and the front surface of the periphery screen 120. The refractive index represents the ability of the material between the current surface and the next surface to deflect FIG. 9 is a partially enlarged view of the near-eye display device according to embodiment two of the present application. With reference to FIGS. 8 and 9, imaging parameters of the adjacent boundaries of the intermediate screen 110 and the periphery screen 120 are described in Table 6.

TABLE 6

Local Imaging Parameters of the Near-eye Display Device
Shown in Embodiment Two of the Present Application

| Location | A | a | B | B |
|---|---|---|---|---|
| FOV (°) | 23.017° | 23.025° | 21.849° | 21.751° |
| Difference (°) | | −0.008° | | 0.098° |

As shown in FIG. 9, in embodiment two, an image formed between two points a and b in the edge region of the intermediate screen 110 intersects with an image formed between two points A and B in the edge region of the periphery screen 120, and the image height of the image between point A and point B is 700 μm. In such way, the images of the intermediate screen 110 and the periphery screen 120 are ensured to have an overlapped region of a certain width. Additionally, as described in Table 6, the fields of view of the four points A, B, a, and b where the imaging at the edge of the intermediate screen 110 and the imaging at the edge of the periphery screen 120 overlap are all in the range of ±25° in embodiment two, which ensures the users' need for sensitivity to the definition of the middle field of view region. Additionally, splicing of two screen images within a small field of view also helps reduce the design difficulty of optical imaging elements and facilitate the implementation of imaging splicing. Additionally, the difference between the fields of view of point A and point a whose imaging overlaps is −0.008°, and the difference between the fields of view of point B and point b whose imaging overlaps is 0.098°. The two differences are both smaller than 0.098°, which ensures the image overlapping effect. In summary, by the configuration of the overlap of some image regions and the limit of the upper limit of the difference between the fields of view of the overlapping pixels, it is possible to make the imaging regions more coherent and to ensure the imaging splicing effect of the intermediate screen 110 and the periphery screen 120, thereby ensuring the user experience.

Figure 10:
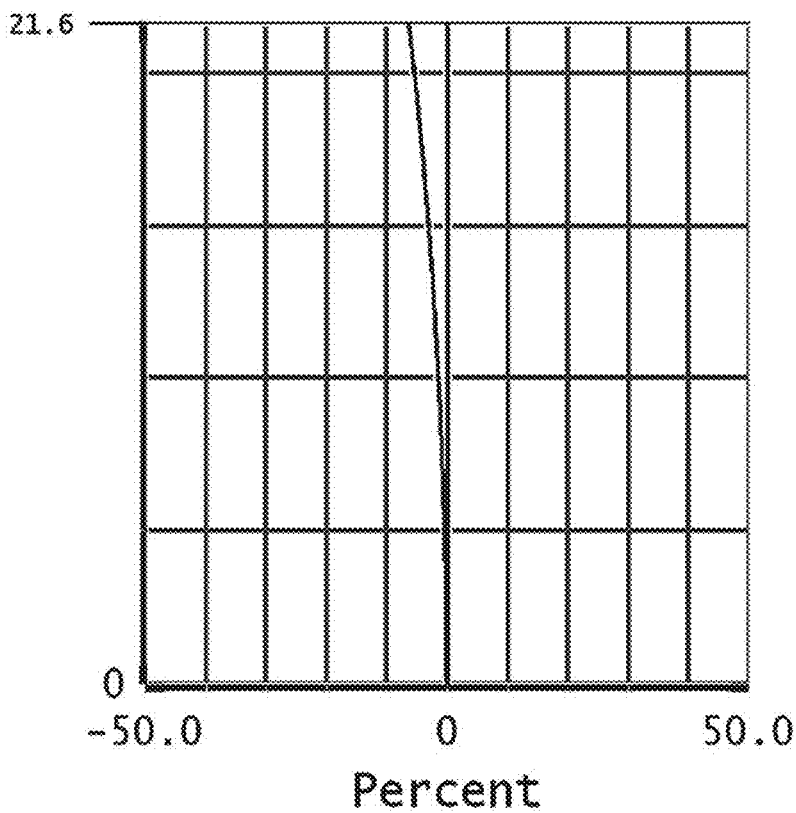
FIG. 10 is a diagram illustrating the distortion of an intermediate screen of the near-eye display device according to embodiment two of the present application.
Figure 11:
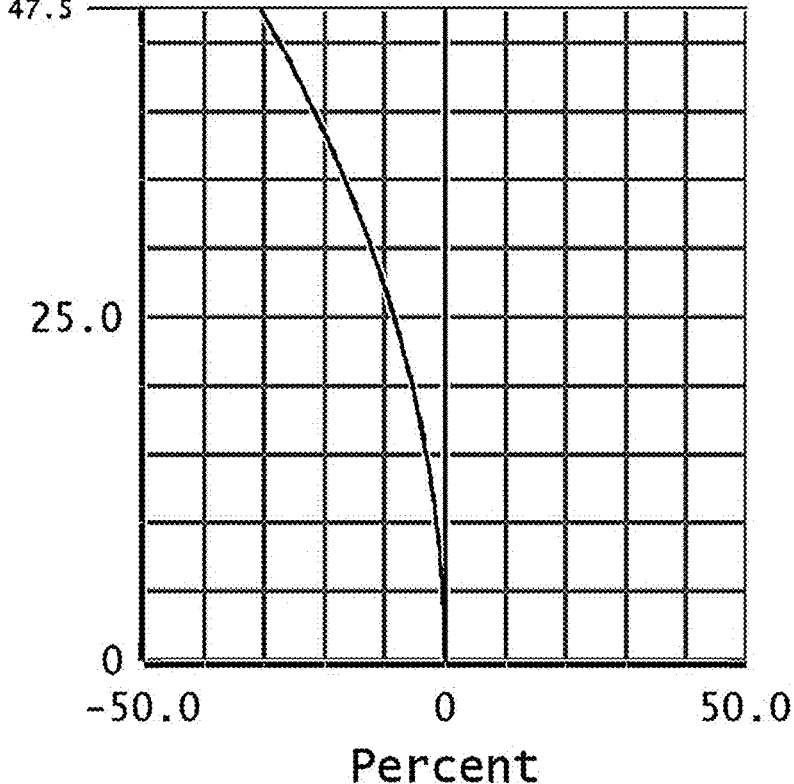
FIG. 11 is a diagram illustrating the distortion of a periphery screen of the near-eye display device according to embodiment two of the present application.
Figure 12:
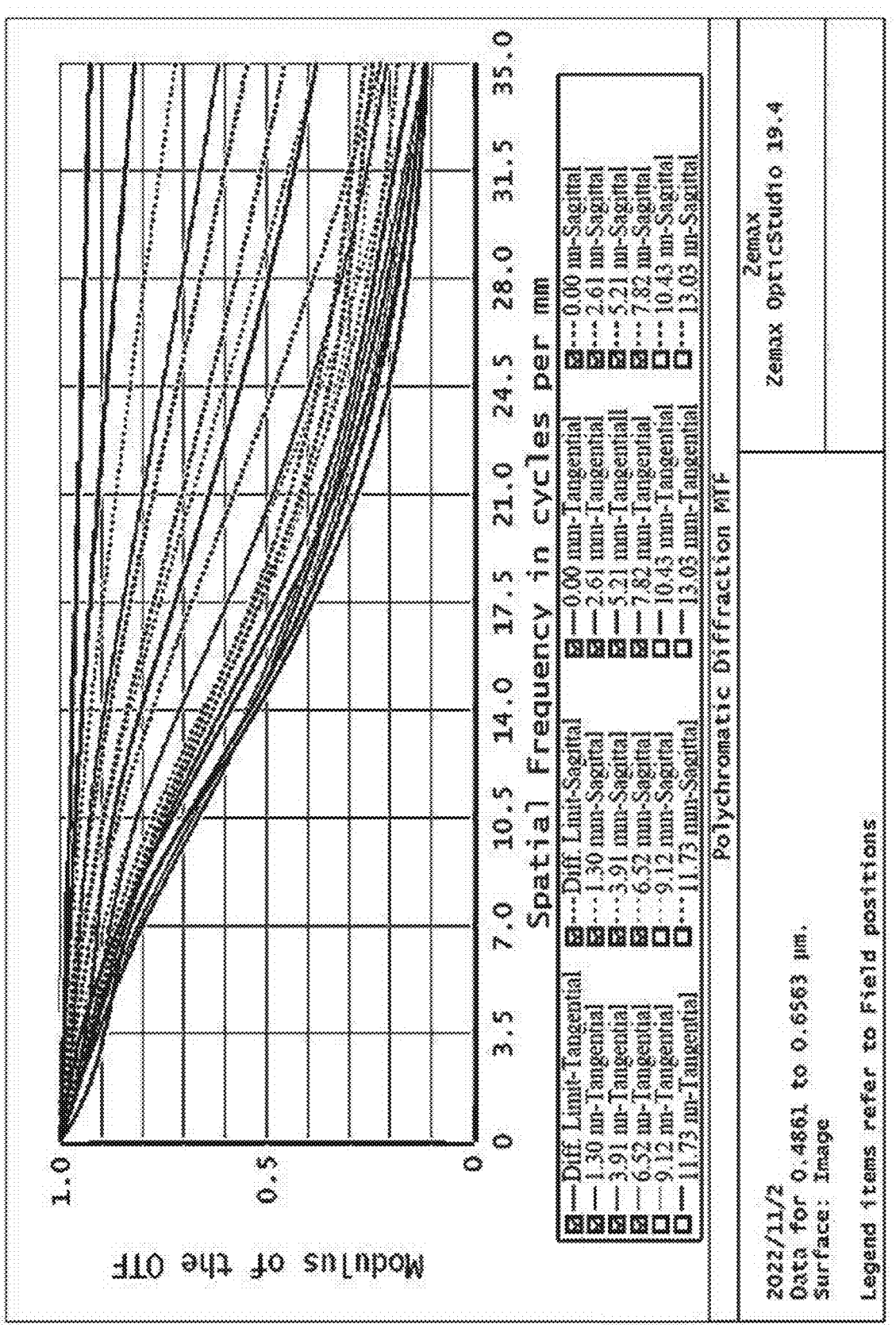
FIG. 12 is an MTF diagram of the intermediate screen of the near-eye display device according to embodiment two of the present application.
Figure 13:
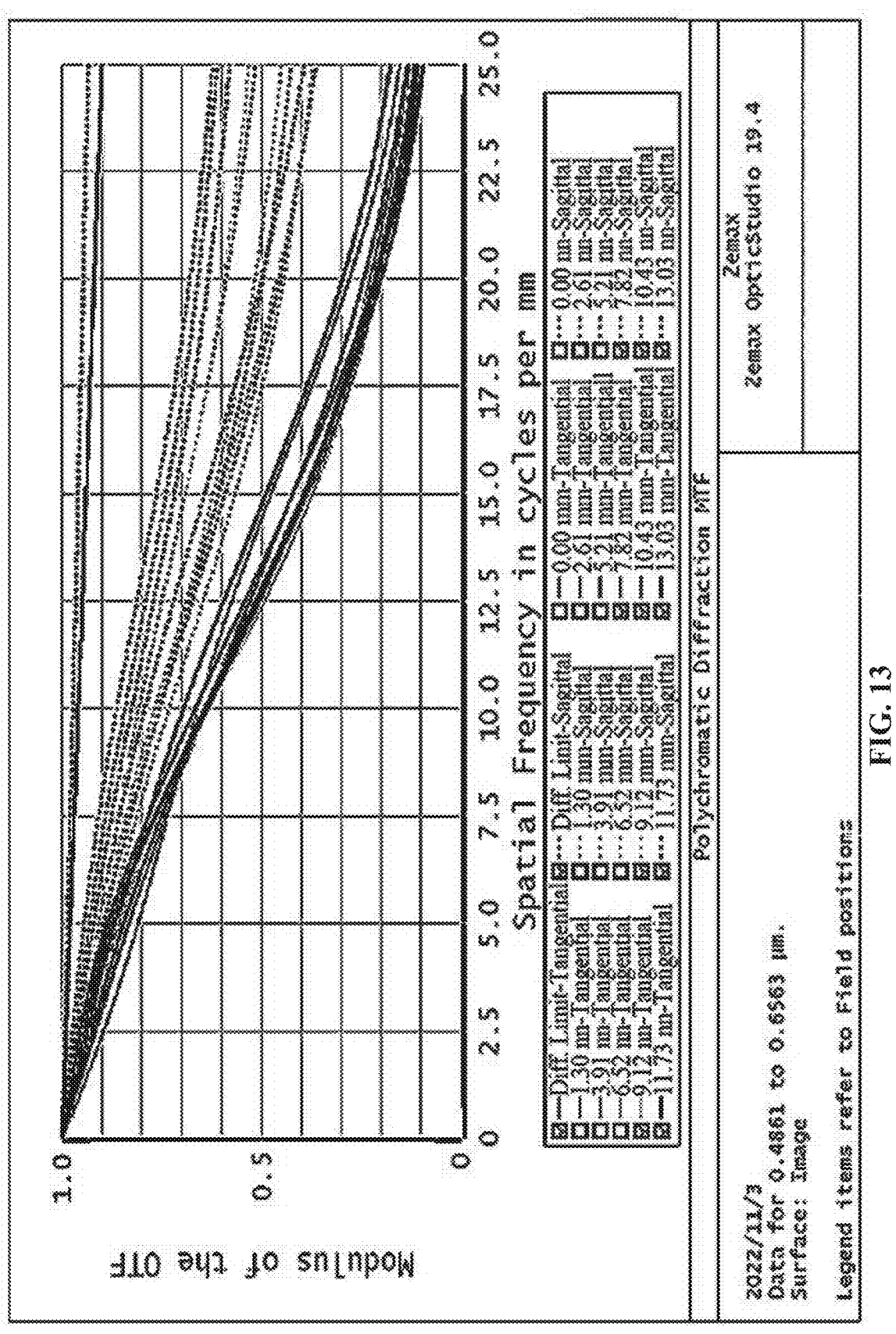
FIG. 13 is an MTF diagram of the periphery screen of the near-eye display device according to embodiment two of the present application.
Figure 14:
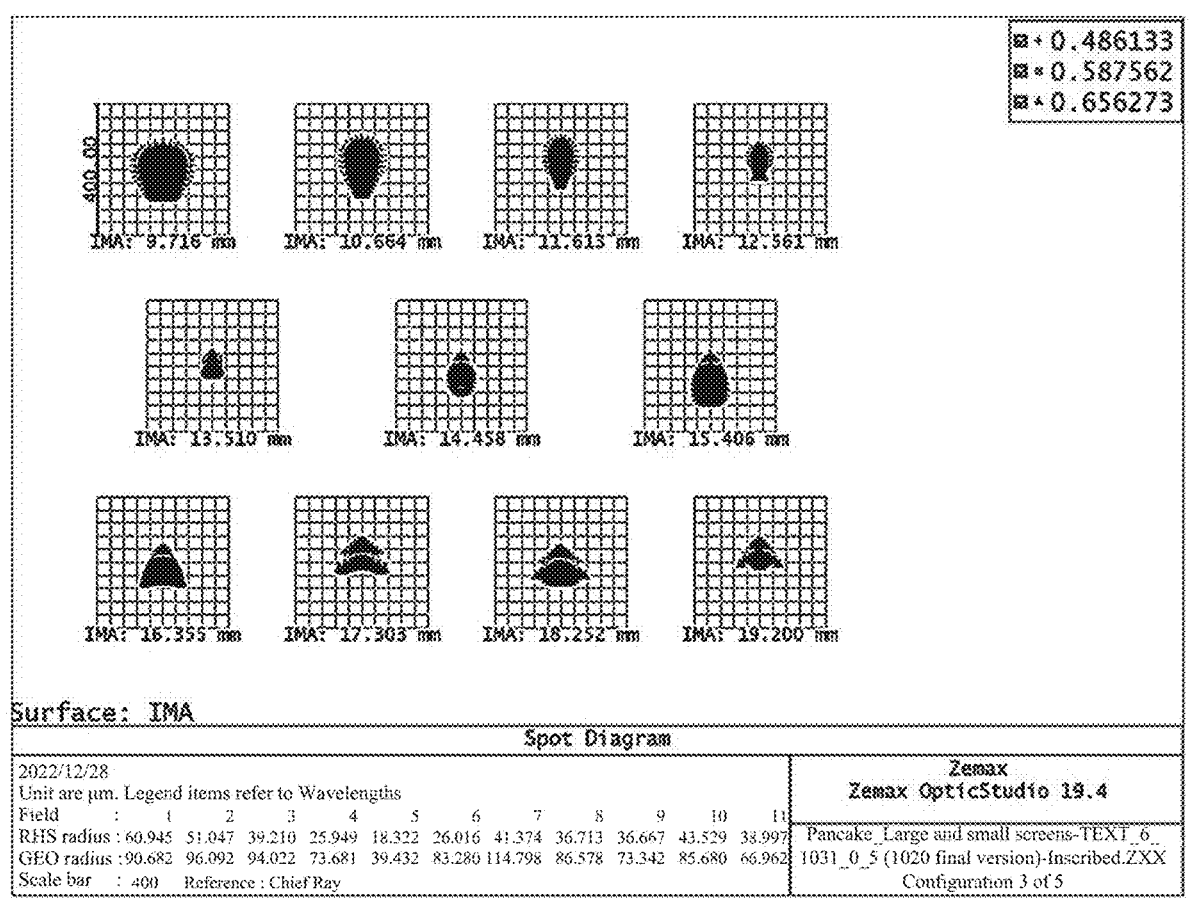
FIG. 14 is a spot diagram of the periphery screen of the near-eye display device according to embodiment two of the present application.

FIG. 10 is a diagram illustrating the distortion of an intermediate screen of the near-eye display device according to embodiment two of the present application. FIG. 11 is a diagram illustrating the distortion of a periphery screen of the near-eye display device according to embodiment two of the present application. FIG. 12 is a modulation transfer function (MTF) diagram of the intermediate screen of the near-eye display device according to embodiment two of the present application. FIG. 13 is an MTF diagram of the periphery screen of the near-eye display device according to embodiment two of the present application. FIG. 14 is a spot diagram of the periphery screen of the near-eye display device according to embodiment two of the present application. In FIGS. 10 and 11, the abscissa represents the distortion variable in percent, and the ordinate represents the field of view in degrees. As shown in FIGS. 10 and 11, in the near-eye display device in this embodiment two, the maximum distortion of the intermediate screen 110 is 6.2360%, which is smaller than ±7%, while the maximum distortion of the periphery screen 120 is 30.5912%, which is smaller than ±31%. The preceding indicates that the imaging system has a better distortion optical performance, that is, the near-eye display device provided in embodiment two of the present application has a good imaging effect. FIGS. 12 and 13 are diagrams illustrating the modulation transfer function. The abscissa in FIGS. 12 and 13 is the spatial frequency in cycles per mm, and the ordinate is the MTF (Modulus of the Optical Transfer Function, Modulus of the OTF) value. As shown in FIGS. 12 and 13, the near-eye display device has a high transfer function in the 0-0.6 field of view of the intermediate screen 110 and the 0.7-1.0 field of view of the periphery screen 120, indicating that the near-eye display device can acquire good resolution capability in both the center field of view and the edge field of view and can meet the resolution requirement of a large field of view. FIG. 14 is a spot diagram showing the spot distribution of 11 field of view locations (14.033 mm to 26.576 mm) at different wavelengths (0.486 μm, 0.588 μm, and 0.656 μm). The maximum value of the RMS radius of the 11 field of view locations is 38.997. In other words, it can be seen from the spot diagram of the periphery screen 120 shown in FIG. 14 that the imaging ranges of different wavelengths of the near-eye display device at different fields of view are all within ±39 μm, which ensures that the aberrations of different field of view regions differ slightly, that is, the near-eye display device better corrects the aberrations of the optical system and has better imaging quality.

An embodiment of the present application also provides a near-eye display optical assembly. With continued reference to FIG. 8, the near-eye display optical assembly includes a first optical element group 200, and the first optical element group 200 includes a first lens 210, a second lens 220, and a third lens 230. The first lens 210, the second lens 220, and the third lens 230 are sequentially arranged along an optical axis, and the first lens 210 and the second lens 220 form a lens group.

Optionally, one surface of the first lens 210 facing to the second lens 220 and one surface of the second lens 220 facing to the first lens 210 are glued to each other to form a glued lens group. The near-eye display optical assembly also includes a second optical element group 300. The second optical element group 300 includes an intermediate portion 310 and a periphery portion 320. The orthographic projection of the periphery portion 320 on an image plane surrounds the orthographic projection of the intermediate portion 310 on the image plane. The intermediate portion 310 is a lens. The periphery portion 320 is a plane mirror.

The second optical element group 300 and the first optical element group 200 are sequentially arranged along the optical axis. The first optical element group 200 and the second optical element group 300 satisfy the following conditions:

$$-0.608 < f_1/f_2 < -0.416.$$

$$-1.854 < f_1/f_3 < -1.5341.159.$$

$f_1$ denotes the focal length of the intermediate portion 310. $f_2$ denotes the focal length of the lens group formed by the first lens 210 and the second lens 220. $f_3$ denotes the focal length of the third lens 230.

Similarly, the preceding near-eye display device includes the near-eye display optical assembly shown in this embodiment. The working principles and working processes of the near-eye display optical assembly and the near-eye display device are the same or similar. The near-eye display optical assembly has the same or similar effects as the near-eye display device, which is not repeated herein.

What is claimed is:
1. A near-eye display device, comprising:
   a splicing display screen comprising an intermediate screen and a periphery screen, wherein an orthographic projection of the intermediate screen on a first plane is surrounded by an orthographic projection of the periphery screen on the first plane, the first plane is a light exit surface of the near-eye display device, and resolution of the intermediate screen is higher than resolution of the periphery screen;

a first optical element group disposed at a light exit side of the splicing display screen; and a second optical element group disposed at the light exit side of the splicing display screen, wherein the second optical element group comprises an intermediate portion and a periphery portion, an orthographic projection of the intermediate portion on the first plane is surrounded by an orthographic projection of the periphery portion on the first plane;

wherein the intermediate screen forms an intermediate image through the first optical element group and the intermediate portion of the second optical element group, the periphery screen forms a periphery image through the first optical element group and the periphery portion of the second optical element group, and adjacent edges of the intermediate image and the periphery image are stitched.

2. The near-eye display device of claim 1, wherein the intermediate portion of the second optical element group and the periphery portion of the second optical element group are lenses, and a focal length of the intermediate portion of the second optical element group is different from a focal length of the periphery portion of the second optical element group.

3. The near-eye display device of claim 1, wherein the first optical element group comprises a first lens, a second lens, and a third lens, and the first lens, the second lens, and the third lens are sequentially arranged on an optical path of light exit of the splicing display screen.

4. The near-eye display device of claim 3, wherein the second optical element group is disposed on one side of the first optical element group facing towards or facing away from the splicing display screen.

5. The near-eye display device of claim 3, wherein the first lens and the second lens constitute a lens group.

6. The near-eye display device of claim 5, wherein the second optical element group is disposed on one side of the first optical element group facing towards the splicing display screen, the intermediate portion and the periphery portion are lenses; and the first optical element group and the second optical element group satisfy following conditions:

$$1.431 < f_1/f_2 < 1.872;$$

$$1.037 < f_3/f_4 < 1.159;$$

wherein $f_1$ denotes a focal length of the lens group, $f_2$ denotes a focal length of the third lens, $f_3$ denotes a focal length of the periphery portion, and $f_4$ denotes a focal length of the intermediate portion.

7. The near-eye display device of claim 5, wherein second optical element group is disposed on one side of first optical element group facing away from the splicing display screen, the intermediate portion is a lens, and the periphery portion is a plane mirror; and the first optical element group and the second optical element group satisfy following conditions:

$$-0.608 < f_1/f_2 < -0.416;$$

$$-1.854 < f_1/f_3 < -1.534;$$

wherein $f_1$ denotes a focal length of the intermediate portion, $f_2$ denotes a focal length of the lens group, and $f_3$ denotes a focal length of the third lens.

8. The near-eye display device of claim 6, wherein the third lens is an aspherical lens.

9. The near-eye display device of claim 8, wherein the periphery portion and the intermediate portion are aspherical lenses in a case where the second optical element group is disposed on one side of the first optical element group facing towards the splicing display screen, and the intermediate portion and the periphery portion are lenses; and the intermediate portion is an aspherical lens in a case where the second optical element group is disposed on one side of the first optical element group facing away from the splicing display screen, the intermediate portion is a lens, and the periphery portion is a plane mirror.

10. The near-eye display device of claim 4, wherein the first lens is a plano-convex lens, the second lens is a concave-convex lens, and the third lens is a biconvex lens.

11. The near-eye display device of claim 1, wherein the adjacent edges of the intermediate image formed by the intermediate screen and the periphery image formed by the periphery screen partially overlap, and an image height of an overlapped region is greater than or equal to 700 μm.

12. The near-eye display device of claim 1, wherein the adjacent edges of the intermediate image formed by the intermediate screen and the periphery image formed by the periphery screen partially overlap; and the intermediate screen comprises a first pixel, the periphery screen comprises a second pixel, imaging of the first pixel is the same as imaging of the second pixel, and a difference between a field of view of the first pixel and a field of view of the second pixel is less than or equal to 0.098°.

13. The near-eye display device of claim 1, wherein the intermediate screen and the periphery screen are misaligned in a direction parallel to the first plane and are misaligned in a direction of an optical axis of light exit of the near-eye display device.

14. The near-eye display device of claim 13, wherein a distance between the intermediate screen and the periphery screen in the direction parallel to the first plane is less than or equal to 1 mm.

15. The near-eye display device of claim 1, wherein a field of view of the intermediate screen is less than or equal to +25°.

16. The near-eye display device of claim 1, wherein the intermediate screen is a silicon-based organic light-emitting diode (OLED) screen, and the periphery screen is a liquid crystal display (LCD) screen.

17. A near-eye display optical assembly, comprising:

a first optical element group, which comprises a first lens, a second lens, and a third lens, wherein the first lens, the second lens, and the third lens are sequentially arranged along an optical axis, and the first lens and the second lens form a lens group; and a second optical element group, which comprises an intermediate portion and a periphery portion, wherein an orthographic projection of the intermediate portion on an image plane is surrounded by an orthographic projection of the periphery portion on the image plane, and the intermediate portion and the periphery portion are lenses;

wherein the first optical element group and the second optical element group are sequentially arranged along the optical axis, and the first optical element group and the second optical element group satisfy following conditions:

$$1.431 < f_1/f_2 < 1.872;$$

$$1.037 < f_3/f_4 < 1.159;$$

wherein $f_1$ denotes a focal length of the lens group, $f_2$ denotes a focal length of the third lens, $f_3$ denotes a focal length of the periphery portion, and $f_4$ denotes a focal length of the intermediate portion.

18. A near-eye display optical assembly, comprising:

a first optical element group, which comprises a first lens, a second lens, and a third lens, wherein the first lens, the second lens, and the third lens are sequentially arranged along an optical axis, and the first lens and the second lens form a lens group; and a second optical element group, which comprises an intermediate portion and a periphery portion, wherein an orthographic projection of the intermediate portion on an image plane is surrounded by an orthographic projection of the periphery portion on the image plane, the intermediate portion is a lens, and the periphery portion is a plane mirror;

wherein the second optical element group and the first optical element group are sequentially arranged along the optical axis, and the first optical element group and the second optical element group satisfy following conditions:

$$-0.608 < f_1/f_2 < -0.416;$$

$$-1.854 < f_1/f_3 < -1.534;$$

wherein $f_1$ denotes a focal length of the intermediate portion, $f_2$ denotes a focal length of the lens group, and $f_3$ denotes a focal length of the third lens.

19. The near-eye display device of claim 7, wherein the third lens is an aspherical lens.

20. The near-eye display device of claim 19, wherein the periphery portion and the intermediate portion are aspherical lenses in a case where the second optical element group is disposed on one side of the first optical element group facing towards the splicing display screen, and the intermediate portion and the periphery portion are lenses; and the intermediate portion is an aspherical lens in a case where the second optical element group is disposed on one side of the first optical element group facing away from the splicing display screen, the intermediate portion is a lens, and the periphery portion is a plane mirror.

\*    \*    \*    \*    \*